Feb. 16, 1971   A. J. ADLER   3,564,384
HIGH EFFICIENCY POWER SUPPLY APPARATUS
Filed Jan. 2, 1969   3 Sheets-Sheet 1

INVENTOR.
ALAN J. ADLER
BY
*Harvey J. Lawhurst*
ATTORNEY

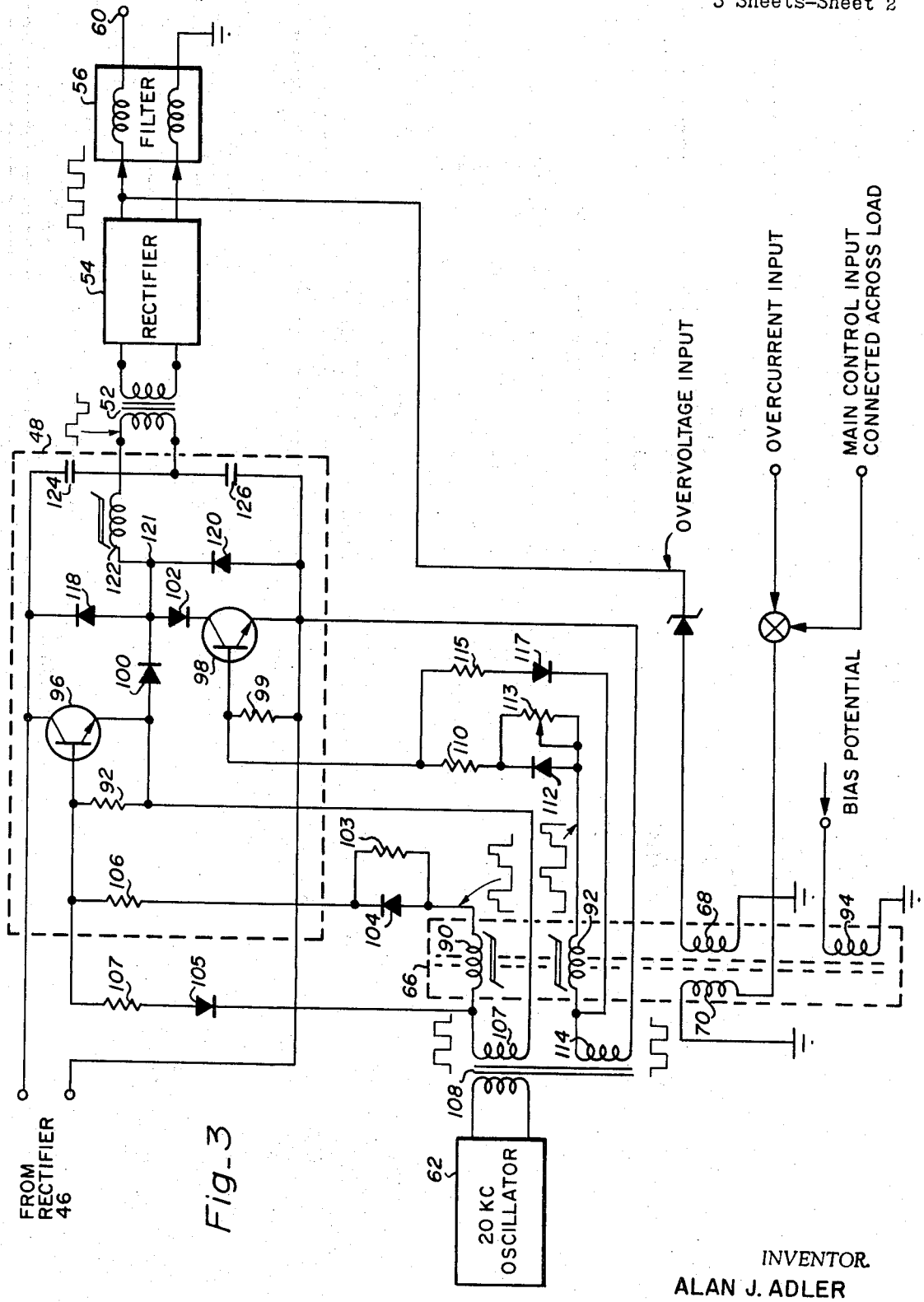

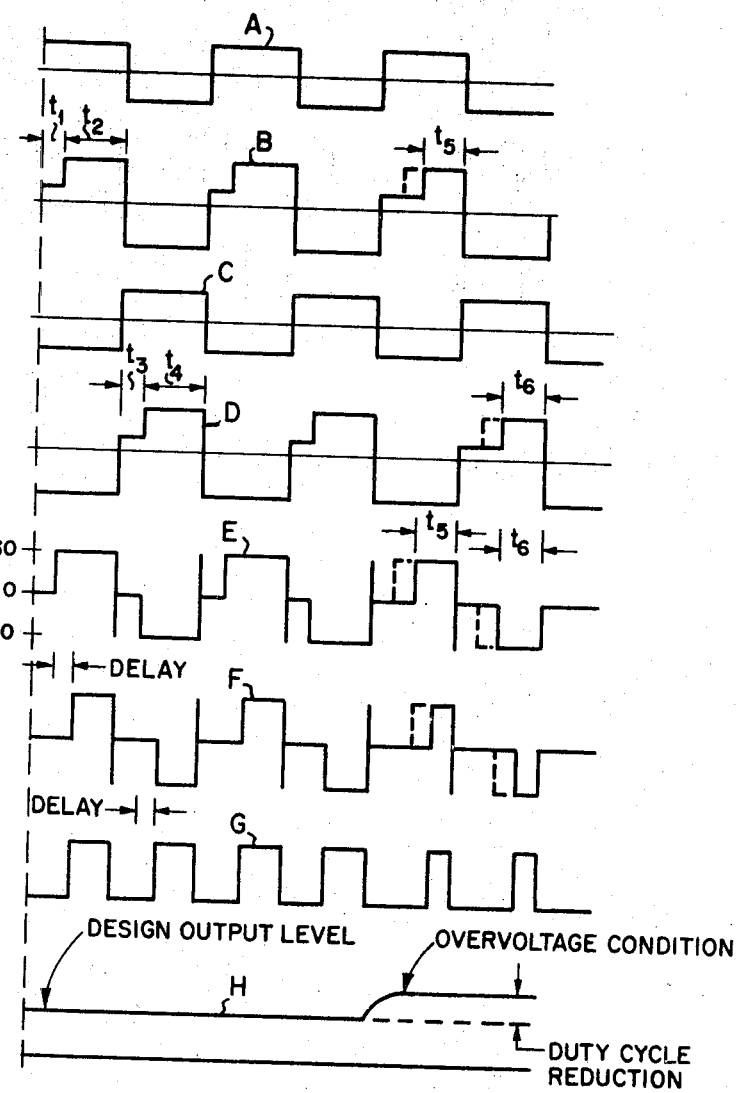
Fig_4

United States Patent Office 3,564,384
Patented Feb. 16, 1971

3,564,384
HIGH EFFICIENCY POWER SUPPLY APPARATUS
Alan J. Adler, Palo Alto, Calif., assignor to RO Associates, Inc., Menlo Park, Calif., a corporation of California
Filed Jan. 2, 1969, Ser. No. 788,471
Int. Cl. H02m 5/40
U.S. Cl. 321—2                                    6 Claims

ABSTRACT OF THE DISCLOSURE

A high efficiency power supply apparatus wherein the duty cycle of the power inverter is varied in accordance with the actual load conditions of the output circuit. A magnetic amplifier, which is responsive to an overvoltage sense detector, an overcurrent sense detector and a load voltage sense detector, is used to control the duty cycle of the power inverter by altering the waveform of the oscillator which is used to drive the power inverter.

BACKGROUND OF THE INVENTION

Conventional DC power supplies convert line voltage, which is typically 115 volts 60-cycle AC, to a desired DC potential by stepping the voltage up or down using a transformer, rectifying it, filtering it somewhat, and then regulating the resultant DC voltage using a regulator which is generally in series with the load. Because of the fact that the line voltage varies considerably both above and below the nominal 115 volts, the series regulator must be capable of handling a large voltage swing and as a result it is not unusual for low voltage supplies that approximately one half of the available output power must be dissipated in the regulator. In addition, since the transformer is placed directly across the line and handles the low frequency input, it must necessarily be quite large and be capable of dissipating the heat which is developed in the transformer at this low frequency. In these rather basic power supply systems, it is not unusual to have an overall efficiency of less than 25 percent.

In an attempt to overcome the aforementioned disadvantages of the simple prior art voltage supply means, apparatus such as is illustrated in FIG. 1 of the drawing have been utilized wherein the low frequency transformer is eliminated from the circuit. The line voltage is rectified and then regulated by a switching regulator before being chopped by an inverter device so as to raise the frequency thereof. The voltage of the resulting high frequency signal is then stepped down through a high frequency transformer which is much smaller in size and is subsequently presented to the load through a series regulator. These types of circuits, however, are also subject to certain disadvantages, perhaps the most important of which is that a large percentage of the available output power must still be lost in the series regulator in the output circuit. Although this type of supply is also available without the series regulator, load regulation is generally poor because the switching regulator does not sense the voltage delivered to the load.

SUMMARY OF THE INVENTION

The present invention relates generally to power supply apparatus and, more particularly, to a novel power supply apparatus which employ high-frequency switching techniques in order to achieve substantial size and weight reductions over conventional devices as well as higher efficiency and greater reliability than is normally available in conventional power supplies.

Briefly, the apparatus of the present invention filters and rectifies the input line voltage to provide a DC voltage which is thereafter converted to a high frequency, in this instance, a 20 kilocycle AC voltage by a power inverter means before being passed through a step-down transformer to provide circuit isolation between input and output. The output of the step-down transformer is then rectified by high speed rectifiers and is filtered to produce the desired DC output. Output voltage regulation is accomplished by using a magnetic amplifier to vary the duty cycle of the power inverter. The magnetic amplifier has three control inputs: the main control input is taken from a voltage sense-amplifier responsive to the device output voltage and thus provides output voltage regulation; an additional input is provided by an overcurrent sense-amplifier which senses the voltage drop across the resistive component of the inductor of the output filter; the third input to the magnetic amplifier is an over-voltage sensing circuit which provides a means for regulating the output voltage in the event of a failure in the normal voltage sense-amplifier.

A principal advantage of the present invention is that no series regulator circuit is required and thus no output power is lost therein as is the case in prior art devices.

Another advantage of the present invention is that the actual output voltage is regulated and thus changes in load in the output circuit are automatically compensated for.

Still another advantage of the present invention is that because of its high frequency operation, a very small step-down transformer can be utilized along with semiconductor components so as to provide a substantial reduction in the size of the apparatus.

Still another advantage of the present invention is that the regulation is accomplished by merely varying the duty cycle of the power inverter in response to various output sensing circuits.

Still another advantage of the present invention is that the immediate rectification and filtering of the primary power source makes the power supply much more insensitive to the transient variations of the primary power source than the conventional 60 c.p.s. power transformer approach.

It is therefore a principal object of the present invention to provide a high efficiency power supply apparatus which provides absolute control of the output voltage independent of variations in input voltage or output load conditions.

Another object of the present invention is to provide a high efficiency power supply apparatus which incorporates high frequency switching techniques in order to achieve substantial size and weight reduction over conventional power supply devices.

Still another object of the present invention is to provide a high efficiency power supply apparatus which includes over-current and over-voltage prevention means as an integral part thereof.

Still another object of the present invention is to provide a high efficiency power supply apparatus wherein the regulatory function is achieved by varying the duty cycle of the power inverter means.

While the novel features which characterize this invention are pointed out with particularity in the claims annexed to and forming part of this specification, the actual invention itself, both as to its structure and manner of operation together with further objects and advantages thereof will best be understood upon reference to the following description taken in connection with the accompanying drawings.

IN THE DRAWING

FIG. 3 is a more detailed schematic of a portion of the present invention; and

FIG. 4 is a timing diagram illustrating the operation of the present invention.

DESCRIPTION OF THE PREFERRED EMBODIMENTS

Figure 1:
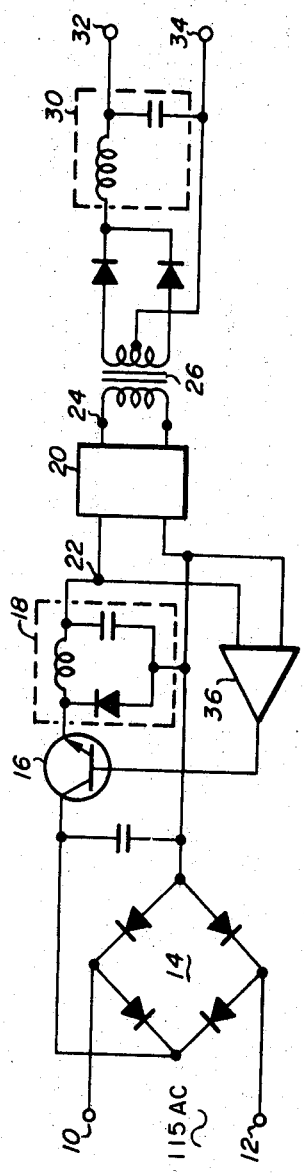
FIG. 1 is a schematic illustration of a prior art high efficiency power supply.

Referring now to the drawing, there is shown in FIG. 1 for purposes of comparison, a high efficiency power supply of the type known in the prior art. The input terminals 10 and 12 are connected across the line voltage which is typically 115 volts 60 cycle AC. This input voltage is then rectified in a full-wave rectifier 14, passed through a switching regulator 16, a filter 18, and then into an inverter 20 which converts DC voltage appearing at point 22 to a high frequency AC output at terminal 24. The AC output is then stepped down in voltage by a high frequency transformer 26, is rectified by a rectifier 28 and is then filtered by a filter means 30 before being made available as a DC output at terminals 32 and 34.

In order to control the voltage appearing at output terminals 32 and 34, provisions are made for controlling the DC voltage level input to the power inverter 20 at point 22. This is achieved by sensing the DC voltage at point 22 with a suitable voltage detector and amplifier means 36 and using the output thereof to control the regulator 16.

Whereas it will be apparent that such a device is capable of providing a relatively well regulated DC output at the terminals 32 and 34 absent any output circuit fault conditions, it must be noted that no means is provided in the output circuit to compensate for load variations which might occur therein to affect the actual sytem output appearing across output terminals 32 and 34. In one modification of this arrangement, a series regulator is inserted in the output circuit to regulate the actual output voltage, but it must be noted that in so doing a relatively large proportion of the output power will necessarily be dissipated in this series regulator. This will, of course, reduce the efficiency of the system as well as introduce another potential source of fault in the output circuit of the apparatus.

Figure 2:
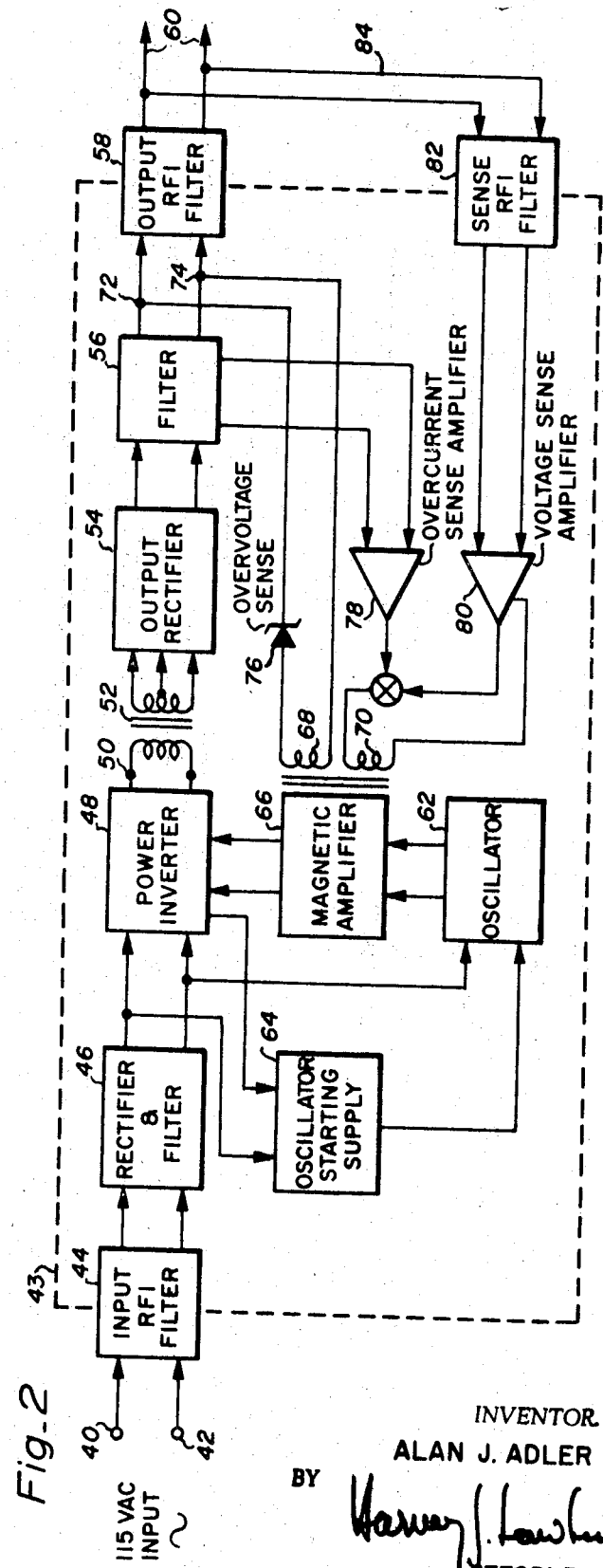
FIG. 2 is a schematic illustration of a high efficiency power supply in accordance with the present invention.

Referring now to FIG. 2 of the drawing, a preferred form of the present invention is illustrated in schematic form. In this embodiment, the line voltage at terminals 40 and 42 is input into the apparatus 43 through a radio frequency interference filter 44 and is then rectified and filtered by suitable rectifier and filter devices 46 before being directly supplied to the input of the power inverter 48. The power inverter 48 then converts the high voltage DC signal into a 20 kilocycle AC signal at the output terminal 50. The high voltage AC signal is subsequently stepped down (in the example) in voltage through a high frequency transformer means 52, is rectified by a rectifier 54, filtered by filter means 56, and then passed through an output radio frequency interference filter 58 before being made available at the device output terminals 60.

The power inverter 48 is driven by a 20 kilocycle oscillator means 62, which includes its own starting supply means 64. The oscillator 62 is coupled to the power inverter 48 through a magnetic amplifier 66 which includes a pair of control coils 68 and 70. The control coil 68 is connected across the output circuit at point 72 and 74. A Zener diode 76, having a breakdown voltage slightly above the design output voltage of the power supply, is placed in series with the control coil 68 and is polarized such that no control current is allowed to flow into the coil 68 unless the output voltage of the power supply at point 72 should exceed the breakdown voltage of the Zener diode 76. Thus, the winding 68 and Zener diode 76 provide an overvoltage sense means which will conduct and start to feed reset current into the magnetic amplifier 66 only if the output voltage of the power supply should exceed the breakdown voltage of the Zener diode 76.

The control coil 70 is energizable from two separate control sources. One of these control sources is comprised of an overcurrent sense amplifier 78, the input of which is connected across an element of the filter 56 so as to sense the current flowing in the output circuit of the power supply. When the current in the output circuit is below a predetermined value, no output is produced by the overcurrent sense amplifier 78 and thus no control current is fed through winding 70 thereby. But should the output current of the power supply exceed that predetermined value, the overcurrent sense amplifier 78 will produce an output which will be fed through the control winding 70 to provide a control input to the magnetic amplifier 66.

The other source of control current which is coupled to the control winding 70 is a voltage sense amplifier 80, the input terminals of which are connected directly across the load terminals 60 through a radio frequency interference filter 82. Should the output voltage at terminal 60 vary from the design voltage of the power supply means, the sense amplifier 80 will produce a correction current which is passed into the control winding 70 of the mag-amp 66. This latter sensing circuit is the main control circuit of the power supply since the other two sources of control current are mainly failsafe apparatus which do not function unless some fault should occur in the output circuit or the load which would cause the output voltage or current to exceed predetermined safe values.

Where the load connected to output terminals 60 is remote, the input leads 84 to the voltage sense amplifier 80 may be removed from the output terminals 60 and extended to the remote location of the load for connection directly thereacross. This provides voltage control directly across the load in a manner which is not influenced by the power loss in the cables connecting the output terminals 60 to the load.

The manner in which the magnetic amplifier 66 operates to control the output voltage in response to the three possible input control signals is to vary the duty cycle of the power inverter 48. By varying the duty cycle thereof, the average power and voltage transmitted through the inverter to the output circuit is either increased or decreased as required to maintain the output voltage at its design value.

Referring now to FIG. 3 of the drawing, the basic internal components of the inverter 48 and the magnetic amplifier 66 are enclosed in the dash lines as indicated. The magnetic amplifier 66 includes a pair of output windings 90 and 92, a pair of control windings 68 and 70, and an additional bias winding 94 for biasing the magnetic amplifier 66 into a predetermined operating range. The winding 94 may be connected to any suitable source of stable voltage, such as might be obtained directly from the output circuit of the power supply apparatus, for example. The inverter 48 includes a pair of transistor switching elements 96 and 98, which are connected in series across the high voltage DC input from rectifier 46.

The emitter of transistor 96 is connected through a pair of diodes 100 and 102 to the collector of the transistor 98. The base of the transistor 96 is connected to one side of the magnetic amplifier winding 90 through a diode 104 and a current limiting resistor 106. The base of the transistor 96 is also coupled to the other side of winding 90 through another diode 105 and coupling resistor 107. The other side of the winding 90 is connected to the emitter of the transistor 96 through the output winding 107 of the transformer 108 which couples the oscillator 62 to the magnetic amplifier 66 and power inverter 48.

The base of the transistor 98 is similarly connected to one side of the magnetic amplifier winding 92 through a current limiting resistor 110 and a diode 112. The emitter of the transistor 98 is connected to the other side of the winding 92 through the output winding 114 of the transformer 108 which also couples another output of the oscillator 62 to the mag-amp and inverter. Also coupled between the base of the transistor 98 and the other side of the winding 92 is a series circuit comprised of a resistor 115 and a diode 117.

A diode 118 is connected across the transistor 96 and diode 110, and a diode 120 is connected across the transistor 98 and the diode 102. The output of the inverter circuit appearing at point 121 is passed through a saturable inductor 122 which provides a short signal "delay" which will be explained below. This output is then passed through the primary winding of the high frequency transformer 52 which has the other side of its input winding coupled to the junction of a pair of bypassed, or DC isolation, capacitors 124 and 126.

Referring additionally to FIG. 4, of the drawing, the operation of the apparatus will be described. With the apparatus input terminals 40 and 42 connected across the 115 volt 60 cycle AC line input, the output of the rectifier 46 is approximately 160 volts DC, where the rectifier is a peak detecting rectifier. Thus, the voltage fed into the power inverter 48 is of about 160 volts. The oscillator 62 causes the inverter 48 to chop the input DC at a 20 kilocycle rate. If the inverter 48 were to be driven solely by the oscillator 62, the duty cycle of the inverter would be expected to approach 100%. This would mean, for example, that the transistors 96 and 98 would each be conductive for half of the time. This is generally the type of inverter which is used in the prior art.

However, in accordance with the present invention, a magnetic amplifier 66 is interposed between the driving oscillator 62 and the inverter 48 so as to vary the duty cycle of the inverter 48 in response to one or more control signals. As a result of these control signals, the duty cycle of the inverter 48 is reduced by causing the transistors 96 and 98 to conduct for shorter periods of time so as to reduce the power made available at the input to the high frequency transformer 52 as required to maintain the voltage at the output terminals 60 at a predetermined value.

Waveform A in FIG. 4 illustrates the input to the mag-amp winding 90 from oscillator 62 through transformer 108. This is generally a square wave which has a positive voltage for one-half cycle (odd) and a negative voltage for the other half cycle (even). In accordance with the performance characteristics of the magnetic amplifier, the time at which the winding 90 saturates after being excited with the positive voltage is a function of the amount of biasing potential initially applied to the core of the mag-amp through the bias winding 94. Thus, the time at which the transistors are rendered conductive can be initially set by applying a suitable biasing potential to the bias winding 94. This time is illustrated as $t_1$ on curve B. During this time the current allowed to pass through the winding 90 is relatively small due to the impedance of the winding 90, but in order to prevent this current from turning ON transistor 96, a bleed resistor 97 is provided across the base and emitter thereof. The value of this resistor is chosen such that in the worst case the voltage produced thereacross will not be sufficient to turn ON the transistor 96.

When the magnetic amplifier saturates, the impedance of the winding 90 goes substantially to zero so that the current therethrough becomes substantially unlimited by the magnetic amplifier. Thus, during the time $t_2$, as shown on curve B of the drawing, an input to the base of transistor 96 is provided sufficient to gate it sharply ON and maintain it conductive during the remaining portion, $t_2$, of the odd half cycles. The resistor 106 is used to limit the current supplied to the base of transistor 96 to within the operating range thereof.

When the oscillator output goes negative at the end of the positive odd half cycles, there would normally be a short time lag caused by the base storage characteristics of the transistor 96 which would prevent sharp cutoff of the transistor 96. However, in order to provide sharp turnoff thereof, a shunting circuit including diode 105 and resistor 107 is provided to bypass the winding 90 and quickly make the base input voltage strongly negative. In addition, a resistor 103 is shunted across diode 104 so as to provide some local feedback for the magnetic amplifier and make its operation more suitable. During even half cycles of the signal provided by oscillator 62, the transistor 96 remains nonconductive.

As shown by curve C of FIG. 4, the output of oscillator 62 to transformer 114 is 180° out of phase with that supplied to transformer 108. Thus, during the odd half cycles the transistor 98 is maintained nonconductive. However, during the even half cycles the positive-going pulse of curve C excites the winding 92 of the magnetic amplifier until at the end of period $t_3$, it saturates and allows turn-on current to be supplied to the base of the transistor 98 during time $t_4$ (see curve D of FIG. 4). This circuit is likewise provided with a bleed resistor 99 for preventing turnon of the transistor 98 during the time $t_3$.

A shunting resistor 113 is also provided across diode 112 so as to provide local feedback for the magnetic amplifier. However, resistor 113 is made adjustable so as to enable the magnetic amplifier to be balanced to make up for slight differences in the cores. Since the pulse times $t_2$ and $t_4$ are determined in part by the balance of conditions of the two cores of the magnetic amplifier 66, the variable resistance 113 enables accurate duplication of the saturation times and as a result the pulse widths during the times $t_2$ and $t_4$. This circuit is also provided with a resistor 115 and diode 117 to provide a return path around winding 92 for causing sharp turnoff of the transistor 98 at the end of the even half cycle.

Turning now to curve E of FIG. 4, the voltage which appears at point 121 in the inverter is shown. During the time $t_1$, the diodes 118 and 120 act as clamps which prevent the voltage at point 121 from exceeding approximately +160 volts or 0 volts when neither transistor is conducting. However, during $t_2$, when transistor 96 is driven conductive, the voltage at point 121 goes to 160 volts and remains at that potential until transistor 96 is turned OFF at the end of time $t_2$ at which time the potential at point 121 swings briefly to 0 volts and then goes to approximately 80 volts. During time $t_3$ of the next half cycle period no change occurs until transistor 98 is turned ON causing the point 121 to go quickly to ground, or zero volts, and remain at that potential throughout the duration of time $t_4$, i.e., until the end of the even half cycle. At the end of $t_4$ transistor 98 is turned OFF and point 121 swings to +160 volts and is returned again to 80 volts as shown.

Since the magnetic amplifier characteristically does not work too well at very narrow pulse widths, the saturable inductor 122 is provided to further limit, by a small fixed amount, the duty cycle of the inverter 48. This means that in short-circuit conditions where the magnetic amplifier must cut back the output of the inverter to very narrow pulse widths, the magnetic amplifier does not have to be driven back quite so far in order to produce the required narrow pulse. Thus, the purpose of the saturable inductor 112 is to provide a fixed "delay" at the front side of each pulse of curve E so as to produce an actual (lower duty cycle) inverter output such as is illustrated by curve F of FIG. 4. A further function of saturable inductor 122 causes the transistor to be switched on during a period when it is not conducting heavily. This reduces the power dissipation of the transistor.

The output voltage F is then passed through the transformer 52 and into rectifier 54 which inverts the negative-going pulses so as to produce an output such as is illustrated by curve G, which is subsequently passed through filter 56 to provide a DC output such as shown by curve H of FIG. 4.

Now referring back to the third cycle of curve B, the manner in which the power supply functions in response to one of the three control signals will be illustrated. For example, suppose the voltage sense amplifier 80 senses an overvoltage condition across the load. It will cause an error signal to be generated in control winding 70 of the magnetic amplifier 66 so as to delay saturation thereof and reduce it to less than the initial period $t_2$ the time $t_5$ during which the transistor 96 is maintained conductive. Likewise, the effect on curve D is to reduce the time $t_6$ of which transistor 98 is maintained conductive to less than the initial time $t_4$.

In accordance with this reduction in the duty cycle of the transistor 96 and 98, the voltage at point 121 is maintained at 160 volts for the period $t_5$ and at zero volts for the period $t_6$. Similarly, the inverter output is reduced by a like amount in addition to the "delay" caused by inductor 122, thus bringing the overall output of the power supply back down to the design output level as illustrated at H in FIG. 4. Should an error condition be detected by either the overvoltage sense circuit or the overcurrent sense amplifier 78, these outputs would have a similar effect on reducing the duty cycle of the inverter 48.

Whereas after having read the above disclosure, many alterations and modifications of the described apparatus will become apparent to those of skill in the art, it is to be understood that this description is of a preferred embodiment for purposes of illustration only and is in no manner intended to be limiting in any sense.

What is claimed is:

1. High efficiency power supply apparatus comprising: input terminal means and output terminal means; first rectifier means coupled to said input terminal means for converting an AC input voltage to a DC voltage; inverter means having its input coupled to said first rectifier means and its output connected to a transformer means, said inverter means including a pair of bipolar transistor switching means and a high frequency oscillator means, said transistor means being connected in series across the input to said inverter means, said oscillator means energizing said transistor means to cause a first terminal of said transformer means to be alternately switched between first and second output terminals of said first rectifier means, said first terminal of said transformer means being connected to a circuit point intermediate said transistor means so that said first and second output terminals of said first rectifier means are alternately coupled to said first transformer terminal as said transistor means are alternately energized by said oscillator means; second rectifier means coupled to said inverter means through said transformer means for converting said high frequency AC voltage to a controlled DC voltage, the output of said second rectifier means being coupled to said output terminal means; magnetic amplifier means coupling said oscillator means to said transistor means so as to make variable the duty cycle of said inverter means; voltage sense amplifier means responsive to the voltage appearing at said output terminal means for providing an error signal in response to any deviation from a predetermined output voltage level appearing at said output terminal means, said error signal being coupled to said magnetic amplifier for controlling the operation thereof; and overcurrent sense amplifier means responsive to the current flowing in the output circuit coupling said second rectifier means to said output terminal means for producing an overcurrent error signal in response to an output circuit current in excess of a predetermined value, said overcurrent error signal being coupled to said magnetic amplifier means for additionally controlling the operation thereof.

2. A high efficiency power supply apparatus as recited in claim 1 wherein the output of said inverter means is coupled to said second rectifier means through a saturable inductor means.

3. High efficiency power supply apparatus comprising: input terminal means for connection to an AC voltage source; output terminal means across which a load may be connected for receiving a regulated DC voltage; first rectifier means coupled to said input terminal means for converting the AC voltage from said AC voltage source to a DC voltage; second rectifier means the output of which is coupled to said output terminal means; power inverter means having its input coupled to said first rectifier means and its output coupled to the input of said second rectifier means through a transformer means, said inverter means including a first transistor switching means, a second transistor switching means and a high frequency oscillator means for energizing said switching means to alternately couple the output of said first rectifier means to the primary of said transformer means so as to generate an AC voltage of a super-audible frequency at the input to said transformer means, said first transistor switching means when conductive coupling one output terminal of said first rectifier means to a first terminal of said transformer means and said second transistor means when conductive coupling another output terminal of said first rectifier means to said first terminal of said transformer means.

4. High efficiency power supply apparatus as recited in claim 3 wherein a control winding of said magnetic amplifier is coupled to the output of said second rectifier means through an overvoltage sensing means which provides an input signal to said control winding only when the output of said second rectifier means exceeds a predetermined voltage level.

5. High efficiency power supply apparatus as recited in claim 4 wherein said magnetic amplifier is also responsive to an overcurrent sense means which is coupled to the output circuit of said power supply apparatus so as to produce a control signal in said magnetic amplifier only upon the occurrence of an overcurrent condition in said output circuit.

6. High efficiency power supply apparatus as recited in claim 5 wherein the output of said power inverter means is coupled to said first terminal of said transformer means through a saturable inductor means which delays by a predetermined time the occurrence of the pulses which are transmitted from the output of the power inverter means to said transformer means thus causing said inverter means to be turned on while in the low power state.

References Cited

UNITED STATES PATENTS

| | | | |
|---|---|---|---|
| 2,809,303 | 10/1957 | Collins | 321—45 |
| 3,078,380 | 2/1963 | Ingman | 321—45 |
| 3,196,335 | 7/1965 | Williams, Jr. | 321—18X |

WILLIAM M. SHOOP, Jr., Primary Examiner

U.S. Cl. X.R.

321—18

UNITED STATES PATENT OFFICE
CERTIFICATE OF CORRECTION

Patent No. 3,564,384      Dated February 16, 1971

Inventor(s) Alan J. Adler

It is certified that error appears in the above-identified patent and that said Letters Patent are hereby corrected as shown below:

Column 8, line 37, after "transformer means" and before the period (.), insert the following:

--; and control means including a magnetic amplifier means responsive to the voltage appearing at said output terminals for controlling the duty cycle of said power inverter means so as to maintain said output voltage at a predetermined value--

Signed and Sealed thi

Twenty-seventh Day of February

[SEAL]

Attest:

RUTH C. MASON
Attesting Officer

DONALD W. BANNER
Commissioner of Patents and Trad